June 13, 1967   R. H. MATTSON   3,325,652
NEURISTOR AND PROCESS FOR MAKING THE SAME
Filed March 6, 1964                                    3 Sheets-Sheet 1
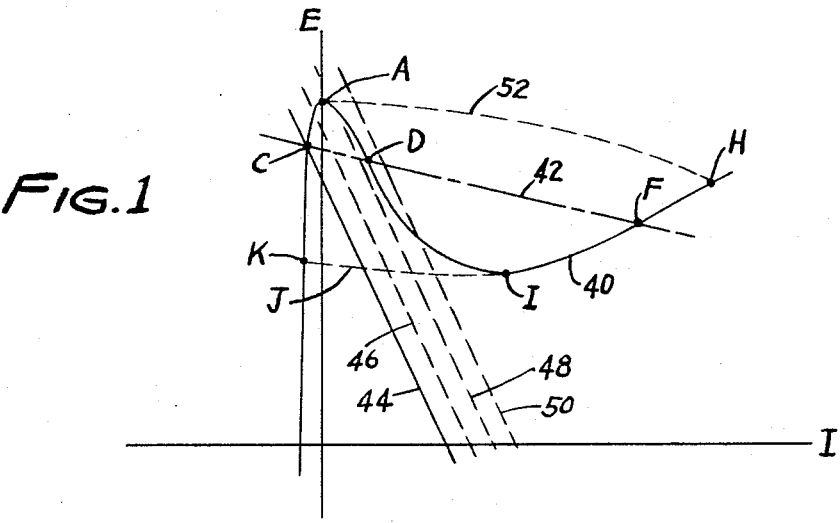
FIG. 1
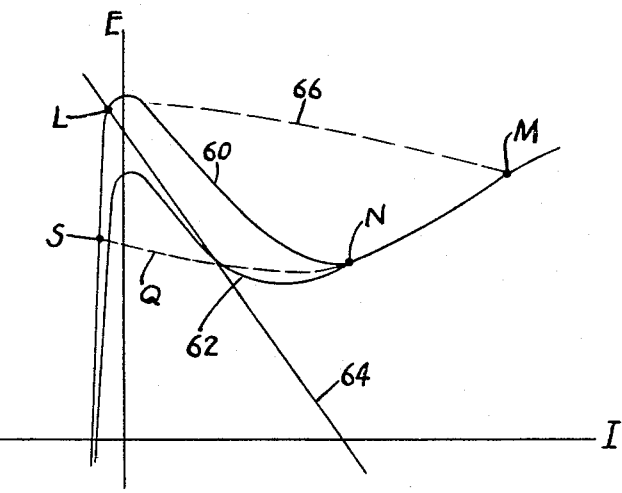
FIG. 2
FIG. 9
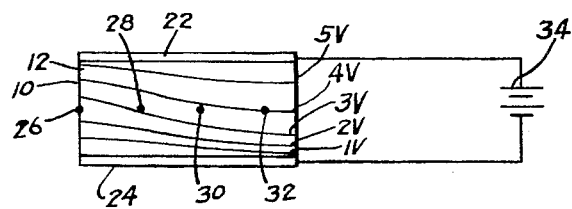
INVENTOR.
ROY H. MATTSON
BY Moore, White & Burd
ATTORNEYS June 13, 1967 R. H. MATTSON 3,325,652
NEURISTOR AND PROCESS FOR MAKING THE SAME
Filed March 6, 1964 3 Sheets-Sheet 2

INVENTOR.
ROY H. MATTSON
BY Moore, White & Burd
ATTORNEYS

INVENTOR.
ROY H. MATTSON
BY Moore, White & Bund
ATTORNEYS

United States Patent Office 3,325,65
Patented June 13, 196

3,325,652
NEURISTOR AND PROCESS FOR MAKING
THE SAME
Roy H. Mattson, Minneapolis, Minn., assignor to The Regents of the University of Minnesota, Minneapolis, Minn., a corporation of Minnesota
Filed Mar. 6, 1964, Ser. No. 349,897
17 Claims. (Cl. 307—88.5)

This is a continuation-in-part of my prior application Ser. No. 312,223 filed Sept. 27, 1963, now abandoned, entitled Neuristor.

The present invention relates to electric current control and more particularly to an improved semi-conductor device which exhibits nerve like impulse propagation and to a process for producing them. Owing to the function similarity in propagation characteristics with those of an animal nerve cell, the invention will be referred to as a neuristor and process for making the same.

The desirability for the development of the neuristor has been previously indicated by H. D. Crane in his report "Neuristor Studies" dated July 11, 1960, Technical Report No. 1506–2, published by the Stanford Electronics Laboratories, Stanford University. In this report, it is pointed out that a neuristor, when developed, could be used for a variety of purposes such as: (1) the construction of new and different types of computer logic, (2) the building of analogs that will simulate neural nets, (3) as well as realizing many Boolean logic functions. Other applications for the present invention will be apparent once its principles of operation are understood.

Crane has defined a neuristor as a device having the form of a one-dimensional channel along which signals may flow, the signals taking the form of propagating discharges having the following properties:
 (1) Threshold stimulability.
 (2) Uniform velocity of propagation.
 (3) Attenuationless propagation.
 (4) Refractory period following the passage of a discharge, after which the neuristor can again support a discharge.

One attempt to produce a neuristor of the type described by Crane was reported in Electronics Magazine dated March 1, 1963, under the title "Experimental Neuristor Gives Nervelike Pulse Propagation." In this article, the author explains the construction of an experimental device which is relatively complex in that a plurality of layers of N and P type material are required for operation. Because of this complexity, manufacture of the device involves significant production, cost and fabrication disadvantages. Moreover, the use of multiple layers increases the opportunity for defects in the finished product thereby reducing reliability. Severe problems are also encountered when the device is to be fabricated in distributed form due to the presence of undesirable longitudinal resistance between terminals.

For other reasons, the prior devices of the type described suffer from various shortcomings and are to some extent ineffective in operation.

In view of these and other shortcomings of the prior art, it is one object of the present invention to provide an improved semi-conductor device which exhibits the following characteristics both individually and collectively: (1) the ability to propagate electrical impulses along a one-dimensional channel, (2) uniform velocity impulse propagation, (3) attenuationless impulse propagation, (4) threshold stimulability, and (5) the presence of a refractory period following the passage of an impulse during which a new impulse can be initiated only by applying a greater than normal stimulus. While the invention is primarily concerned with devices exhibiting all of the above mentioned characteristics simultaneously, it shoul be understood it may, in some cases, be desirable that on or more of these characteristics be absent.

Briefly stated, the present invention provides a body c a semi-conductor material treated so as to be of a particu lar type, n or p, by the addition of a minor amount c material adapted to carry an electrical charge of a firs sign with a pair of ohmic contacts affixed to said bod at spaced apart positions thereon and a plurality of sepa rate and distinct spacially separated p-n junctions forme to the body of semi-conductor material.

The invention will be best understood by reference t the accompanying description and to the figures therei the same numerals refer to corresponding parts in th several views and wherein:

FIGURE 1 is a graph illustrating the voltage, curren characteristics of each junction embodying the presen invention under various driving conditions;

FIGURE 2 is a graph illustrating the voltage, curren characteristics of each junction with a neighboring junc tion operating at two different voltages;

FIGURE 9 is a diagrammatic plan view of the neuristor of FIGURE 3 illustrating a plurality of curved equipotential lines on its upper surface;

Figure 3:
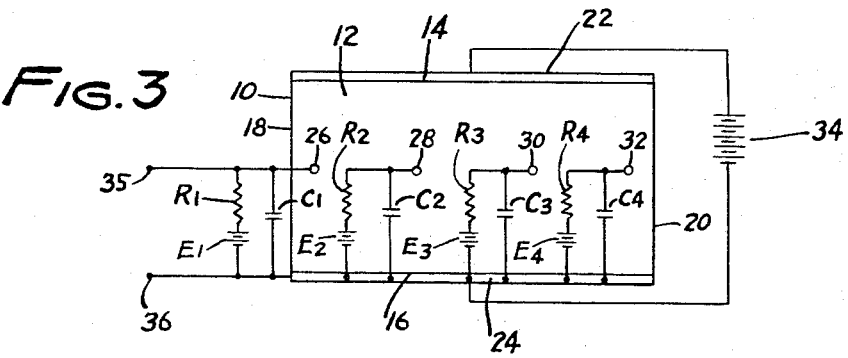
FIGURE 3 is a schematic diagram illustrating a neu ristor according to the present invention when wired t an electrical circuit.

Refer now to FIGURE 3 which illustrates, by way of example, one preferred form of the present invention. In FIGURE 3 there is shown a neuristor 10 composed of a generally rectangular block of semi-conductor material 12 which is suitably treated by doping to carry an electrical current. The material 12 can conventionally be formed from a lightly doped n type germanium.

While the body of the neuristor 12 can have various forms, it is preferably rectangular and includes parallel upper and lower walls 14 and 16 and parallel side walls 18 and 20 which extend at right angles to the walls 14 and 16. Suitably bonded to the walls 14 and 16 and extending their entire length are a pair of ohmic contacts 22 and 24 formed from a conductive material. While the ohmic contacts can be composed of a variety of materials as will be apparent to those skilled in the art, they can conventionally be formed from lead when germanium is used. The contacts 22 and 24 can be secured to the germanium block 2 in any well known and conventional manner such as by heat fusion or by alloying as desired.

Suitably bonded to one face of the block 12 are a plurality of discrete spacially separated linearly aligned and identical bodies 26, 28, 30 and 32 adapted to form a p-n junction between their lower surfaces and the body 12 of the neuristor. The buttons 26-32 can, for example, be formed from indium alloyed to the N germanium 12. Although the spacing between the buttons can vary, it is preferably constant.

A suitable array of voltage sources $E_1$-$E_4$ is wired between the buttons 26-32 respectively and the contact 24. Connected in series relationship with the voltage sources are resistance $R_1$-$R_4$ respectively. Suitably wired between each of the buttons 26-32 and the contact 24 are capacitance $C_1$-$C_4$ respectively. Wired between the ohmic contacts 22 and 24 is a source of current such as a battery 34. Wired across the resistor R, and battery E, are a pair of input terminals 35 and 36. While the values of the circuit components can be varied to suit the particular circumstances encountered, a set of values is provided below by way of example.

| | | |
|---|---|---|
| Battery 34 | v | 6.5 |
| $C_1$-$C_4$ | mfd | .2 |
| $R_1$-$R_4$ | | 100KΩ |
| $E_1$-$E_4$ | v | 5 to 5.5 |

The operation of the device of FIGURE 3 will now be explained. To this end, it is convenient to consider first the operation of a single transverse segment of the neuristor including for example the extreme left end of contact 22, the body of the semi-conductor 12 adjacent thereto, the button 26 and the extreme left end of contact 24. It should, of course, be understood that what is said of the segment including button 26 will also be true of those segments including buttons 28, 30 and 32.

When the neuristor 10 is at rest, there is a relatively high resistance between a point directly below the button 26 and the ohmic contact 24. As will be apparent, the resistance in this region is a function of the number of carriers injected into this area across the p-n junction. Thus, the injection of holes into the material 12 of the neuristor will change the resistance therein and in this way the current at the p-n junction will function to modulate the conductivity of the adjacent section of semi-conductor material. While in many semi-conductor devices it is desired to minimize the degree of the conductivity modulation, in the present invention this characteristic is utilized during operation as will be explained fully hereinbelow.

Referring now to FIGURE 1, there is shown an action or voltage-current characteristic curve 40 which depicts the current I through the button 26 as a result of the changes in potential E applied to that button with battery 34 applied. All buttons 26, 28, 30 and 32 exhibit this characteristic. It will be noted first that the potential rises in an almost vertical lines as I increases. It then reaches a peak, begins to drop then levels off and rises slowly a second time. The peak potential A in FIGURE 1 can be regulated by increasing or decreasing the potential applied at battery 34.

As the current begins to flow through the buttons 26, holes will be injected into the material 12, and these holes will be swept by the effect of battery 34 towards ohmic contact 24. Associated with each value of injected current there is a value of charge stored in the N type material. This stored charge, due to the injection of holes, is compensated by electrons and the net effect is to reduce the resistance of the semi-conductor in that storage region. The decreasing resistance of the material 12 causes the potential E to decrease with increasing current I until saturation effects occur. As can be clearly seen in FIGURE 1, after the peak A is reached the potential drops as the current increases, and this is due to the injected holes causing conductivity modulation of material 12. This portion of the curve 40 will be referred to as the negative resistance portion. The extent to which this negative resistance effect takes place is dependent upon the geometry of the semi-conductor body, the physical state of the semi-conductor material, the hole or minority carrier injection efficiency and lifetime as well as the battery 34.

There will, of course, be no hole injection until the given button is charged positively with respect to the potential of the portion of the neuristor body to which the button is attached. The potential required for this action is in turn determined by the potential applied across the ohmic contacts 22 and 24.

If the button 26 is negative with respect to the potential of that point of the neuristor in contact with the button, then little current will flow between the p-n junction and the contact 24 as will be readily apparent because the junction is reverse biased. As the button becomes positive with respect to that part of the N type material in contact with it, current will start to flow and the hole injection commences. As the concentration of injected holes increases, the resistance between the buttons 26 and the contact 24 will decrease and a negative resistance portion of the curve of FIGURE 1 will be formed, because of the presence of battery 34. Eventually, as saturation takes place, the curve 40 will begin to rise at the right as seen in FIGURE 1. In this portion of the curve, the extent of increased hole injection due to increased current is not sufficient to cause a further decrease in the resistance sufficient to continue the negative slope.

The point on the curve 40 at which the segment including button 26 operates will be a function of the driving circuit composed of resistance $R_1$ and the voltage $E_1$. Where $R_1$ is relatively small, points C and F could be stable operating points for a driving circuit having operating characteristics resulting in the load line shown as curve 42. The circuit will, however, be unstable at point D. Whether or not the device operates at point C or at point F will, of course, depend upon the history of the circuit.

If it is assumed that the drive circuit characteristics have a steeper slope, as shown in curve 44, the device will then stablize for operation at point C. By increasing or decreasing the value of $E_1$, the curve 44 can be displaced as shown in FIGURE 1 to any of the positions 46, 48 or 50. As the potential at $E_1$ is increased, as shown by the curves 46-50, the operating point C will be transferred to the negative slope portion of curve 40 which will not permit stable operation because of the capacitance $C_1$, thereby causing the device to trigger. In accordance with the present invention, the operating characteristics of the drive circuit are set at substantially the value of curve 44 of FIGURE 1 with respect to curve 40. Now by introducing a small pulse in the proper sense across electrodes 35 and 36, the curve 44 will move toward the right until the operating point C passes to the right of point A as seen in FIGURE 1. When this takes place, the negative slope portion of the curve 40 will be encountered and there will be a transition in the drive circuit operating conditions along dotted line 52 until the curve 40 is reached at point H at which time the condenser $C_1$ will discharge.

As this takes place, the operating point of the circuit will drop along curve 40 from point H to point I and will then transfer along a dotted line J to a point K. It will finally travel upwardly on curve 40, as the condenser $C_1$ charges, and return to point C. The operating point of the circuit will remain at point C until another impulse is impressed across the terminals 35 and 36.

Referring now to FIGURE 2, and assuming the DC operating characteristics of the drive circuit of an injecting button are represented by curve 64, the operating point on curve 60 will move to an unstable position when the location of the curve 60 is moved to position 62. Thus, when the operating characteristics are represented by curve 60, the circuit will be stable at point L. However, when the position of the curve 60 is lowered to the position 62, curve 64 will intersect with the negative slope of curve 62 thereby causing the segment of the neuristor represented in the figure to trigger. Thus, each segment or injecting button of the neuristor can be triggered in this manner if the peak voltage of the curve 60 can be lowered so that the intersection of the drive circuit load line 64 and the curve occurs in the negative resistance region.

When the curve 60 is thus lowered to the position 62, the operating point L will be carried along a dotted line 66 to point M and will then drop along the curve 60 to a point N. It will next move along a line Q to point S and finally will rise again to the stable operating point L, assuming the initiating action has been removed.

Referring now to FIGURE 9, there is shown a plurality of curved equipotential lines designated from 5V to 1V on the face of the body 12 to indicate the potential at various locations within the neuristor 10. Assuming as shown in the figure that the potential has been lowered in the body 12 in the area adjacent to and under button 26, by the application of a current to the button 26 or by the triggering of button 26, it can be seen that the potential will also lower in the vicinity of the button 28. When the potential is thus lowered in the vicinity of the button 28, the effect will be the same as that which takes place when the curve 60 is lowered to the position 62. In this manner, the operating point of the transverse segment of the neuristor including button 28 will pass to the left of the peak of the curve 60, thereby causing button 28 to trigger. Again, as the button 28 triggers, the potential in the body 12 under button 30 will be decreased thereby causing button 30 to trigger which will, in turn, trigger button 32. In this manner, each button proceeding from left to right will be triggered in succession with the result that an impulse is transmitted from the left end of the neuristor 10 to the right end at a substantially uniform and controlled velocity.

After the passage of this impulse across any given point of the neuristor, there will be present a refractory period in which the operating point of that segment of the neuristor will return to the stable operating point C of FIGURE 1. During that time, the neuristor cannot be stimulated unless a much greater than normal triggering impulse is applied across the terminals 35 and 36. The time required for a complete cycle of operation of each button of the neuristor 10 will be determined by the characteristics of the material 12 and by the value of the $R_1$–$R_4$ and $C_1$–$C_4$ combination.

As can be readily seen, the impulse will follow a one-dimensional channel from left to right as viewed in FIGURE 3. It will moreover be controlled in velocity and while the velocity is preferably uniform, it can be varied if desired by controlling point C of FIGURE 1 and the RC time constants in the circuit. Once the impulse is initiated, it will continue travelling from one end of the neuristor to the other. Moreover, there will be present a threshold below which the device cannot be stimulated. The impulse, furthermore, is not attenuated as it passes through the device and finally as mentioned above a refractory period is present during which the device cannot be stimulated by a threshold triggering impulse.

Figures 4, 5:
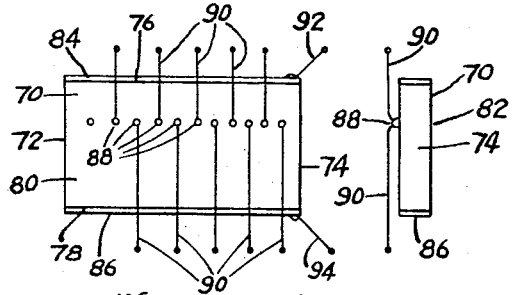
FIGURE 4 is a front elevational view of a neuristo embodying the present invention.
FIGURE 5 is an end elevational view of the neuristo of FIGURE 4.

Refer now to FIGURE 4 which illustrates, by way of example, a neuristor which was constructed for test purposes in accordance with the present invention. The device of FIGURE 4 consisted of a piece of lightly doped N type germanium 70 having a rectangular shape and including end walls 72 and 74, parallel side walls 76 and 78, front and back walls 80 and 82. On the side walls 76 and 78 were provided parallel and elongated ohmic contacts 84 and 86 formed from lead and fusion bonded to the surface of the germanium. Somewhat closer to the ohmic contact 84 than contact 86 were provided a plurality of linearly arranged and uniformly spaced indium pellets which were alloyed onto the germanium to form p-n junctions 88.

To the pellets were wired suitable conductors 90. Conductors 92 and 94 were wired to the ohmic contacts 84 and 86 respectively. The length of the device was 1.1 cm distance between the ohmic contacts 84 and 86 was cm. and the thickness was about .2 cm.

Figures 6, 7:
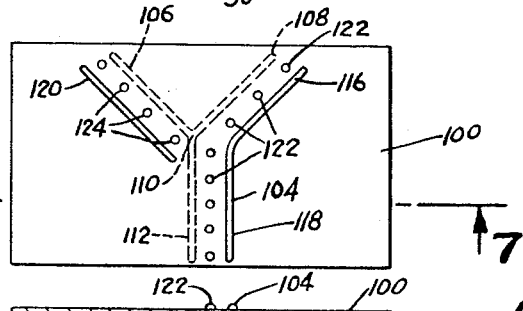
FIGURE 6 is a front elevational view of another form of neuristor according to the present invention with con necting conductors removed.
FIGURE 7 is a transverse sectional view taken on line 7—7 of FIGURE 6.
Figure 8:
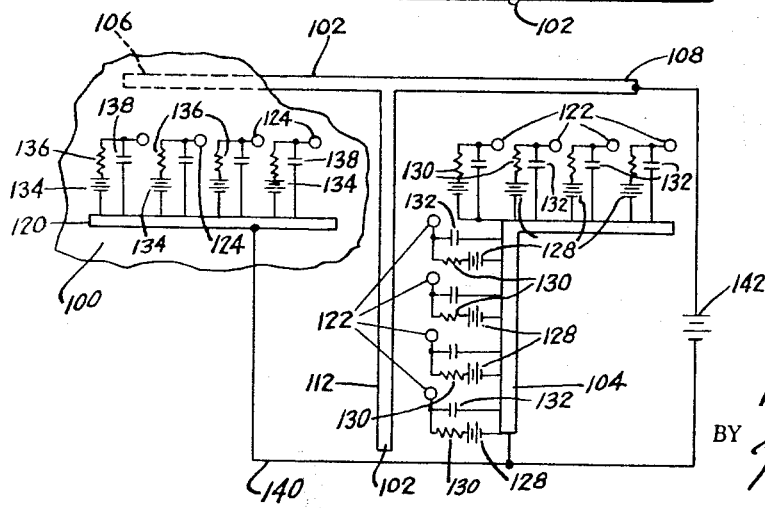
FIGURE 8 is a schematic diagram of a neuristor of the type illustrated in FIGURE 6 when wired to produce T type operation.

Refer now to FIGURES 6, 7 and 8 which illustrate the use of the invention as applied in constructing a T junction. The T junction neuristor of FIGURES 6, 7 and includes a semi-conductor device 100 suitably treated carry an electric charge and having parallel upper ar lower surfaces. The device 100 can conveniently be formed from a lightly doped N type germanium. Bonded to the lower and upper surfaces of the device 100 are pair of ohmic contacts 102 and 104 respectively, the contact 102 being generally Y-shaped and having arms 106 and 108 which diverge at an angle at approximately 90 with respect to one another from a central connecting point 110 which also contacts a bottom portion 112. I FIGURE 8, the arms 106 and 108 are illustrated as straight line to improve clarity.

The contact 104 on the top surface of the germanium 100 includes two portions indicated at 116 and 118 an positioned parallel to the arms 108 and 112 of the contact 102. The contact on the front surface of the germanium 100 includes another segment 120 which is parallel to the arm 106 of the contact 102.

Positioned somewhat to the left as seen in FIGURES 6, 7 and 8 of the contact 104 are a plurality of equally spaced and aligned contact buttons 122. Positioned somewhat to the right and slightly above the segment 120 is a row of contact buttons 124. The contact buttons 122 and 124 are adapted to form p-n junctions and for convenience can be formed from indium alloyed to the surface of the germanium.

Wires between each of the buttons 122 and the ohmic contact 104 is a source of current such as a battery 128 in series with a resistance 130. Wired between each button 122 and the contact 104 is a capacitor 132. Similarly between each of the buttons 124 and the contact 120 is wired a source of current such as a battery 134 in series with a resistance 136. A capacitor 138 is wired between each of the buttons 124 and the contact 120. The ohmic contacts 120 and 104 are wired to each other by means of a conductor 140. Across the front and rear ohmic contacts is wired a source of current such as battery 142.

As seen in FIGURE 8, the top contacts 104 and 120 are biased negatively with respect to the contact 102 The current will flow through the germanium body 100 upwardly and toward the right as seen in FIGURE 7 The indium pellets 122 will impart a negative resistance characteristic to the body 100 as discussed hereinabove due to the injection of minority carriers. By properly biasing the indium pellets 122 and 124 as shown, an electrical disturbance will be propagated along any of the lines formed by the rows of pellets.

If a disturbance begins at the lowermost pellet 122 as seen in the figures, then an impulse will be transmitted along both of the diagonal lines of pellets because when the pellet 122 positioned above the junction 110 is fired, the lowering of its potential will cause the next adjacent dots on both of the oblique lines of pellets to be triggered thus splitting the impulse and causing it to proceed along two separate paths. Thus, a pulse appearing at junction 110 from any line will propagate away from the junction along the other lines. This is a T junction.

The concept of a T junction was checked using a device as shown in FIGURE 4. This device was properly biased using the circuitry as shown in FIGURE 3, and a button that is arranged centrally was externally triggered. It was then observed that the impulse traveled from the center towards both ends of the device.

It was also observed that impulses generated simultaneously at both ends of the device shown in FIGURE 4, when the device is properly biased, traveled towards the center of the line at which point both disappeared. This a desired neuristor characteristic. It will be understood by those skilled in the art that other types of junctions such as R and S type junctions as well as T junctions can be constructed with the present invention, such as by joining corresponding pairs of pellets 122 and 124 directly together for an R junction, and through a capacitor for an S junction. These connections are not shown in the drawings, but are readily understood by reference to the above description and the Crane articles cited above.

It should be apparent that the device can be constructed in many ways. Generally speaking the application for which the neuristor according to the present invention is employed will involve interconnecting the neuristor together in large numbers. Thus, to make even a small computer out of neuristors it would be necessary to have perhaps a thousand or many thousand p-n junctions present and to interconnect the neuristor lines with T and S junctions.

Among the variations which can be made in the fabrication of the neuristor in accordance with the present invention is the provision of a plurality of ohmic buttons in place of each ohmic strip. In the event this variation were utilized, each transverse segment of the neuristor would be composed of two ohmic buttons on the semi-conductor material and a p-n junction between them.

Refer now particularly to FIGURES 10–14 which illustrate a neuristor construction in accordance with the modified form of the invention. While the neuristor devices described hereinabove are suitable for many purposes, one disadvantage they have is that it is often inconvenient or impossible to form junctions of neuristor lines wherein an odd number of lines intersect since it is necessary to maintain a potential difference between the ohmic contact bars on opposite sides of each line of p-n junction buttons. In the neuristor of FIGURES 10–15, any reasonable number of neuristor lines can intersect at a point.

The neuristor illustrated in FIGURES 10–14 comprises a semi-conductor disk or body 150 which can be formed from a sheet of a lightly doped p type silicon of a suitable commercially available type such as 660 ohm-centimeter silicon. The semi-conductor body 150 includes upper and lower parallel surfaces 152 and 154 respectively. The lower surface 154 is conductively secured as by a soldered ohmic contact 155 to a base 158 which can be formed from brass or other conductive material. Current is supplied to the base 158 through a conductor 160 which is soldered thereto at 162.

Upon the upper surface 152 of the semi-conductor body 150 are circular p-n junctions or injector rings 164 and 165. The rings 164 and 165 are each positioned concentrically around a suitable ohmic junction or contact comprising an electrically conductive metallic contact such as a gold ball 168 thermo-compression bonded to a point on the semi-conductor body 150 in the center of each injector ring. Current is supplied to the ball 168 by means of a conductor such as a gold wire 170.

The rings 164 and 165 each comprise a surface layer 172 formed from an electron donor material of a suitable known composition such as phosphorous atoms diffused into body 150 to a depth of approximately 50–100 microns. Current can be supplied to the rings 164 and 165 by means of suitable conductive bodies such as gold balls 174 thermocompression bonded thereto. Current is supplied to the balls through conductors such as gold wires 176.

The p-n junctions 164 and 165 need not be completed rings so long as they extend around a substantial part of the contacts 168 at their center. Moreover, the rings can, if desired, comprise a plurality of p-n junctions positioned around the contact 168. If n type silicon substrate were used, an acceptor impurity such as boron should be used rather than phosphorous as the diffusant impurity.

It should be noted that each injector ring and ohmic contact at its center together with the adjacent segment of the disk 150 and the ohmic contact 155 define an impulse transfer cell or unit. These cells are arranged in lines to form transmission pathways. While only two injector rings 164 and 165 have been illustrated in the device of FIGURE 14, it will be understood that in the usual case, a larger number will often be employed on the same semi-conductor body 150 as fully described hereinbelow in connection with the device of FIGURE 15. The size of the disk 150 can conveniently be about one-half to three quarters inches in diameter. The thickness of the disk 150 can conveniently be about 1 mm.

Throughout the specification by the term "lightly doped" I refer to a semi-conductor material having impurities in a preferred range of about one impurity atom for each $10^8$–$10^{10}$ pure atoms. By the term "impulse transfer cell," I mean a functional component of a neuristor device adapted to change states upon receiving an electrical stimulus and in changing states produces a pulse capable of actuating another such cell.

The conductors 170 are both wired to conductor 178 which is connected to the positive terminal of a source of current such as a battery 180. The negative terminal of battery 180 is connected by means of the conductor 160 to the ohmic contact 155 forming the lower surface of the semi-conductor body 150.

Each of the conductors 176 is connected to a resistance 182 in series with a current source 184. The negative terminal of the batteries 184 are connected through the resistance 182 to the injector rings 164 and 165. Their positive terminals are connected by means of conductor 186 to the positive terminal of the battery 180.

By way of example, the value of the current sources 184 can be about 15 to 18 volts, the value of the resistances 182 about 100K ohms, the value of the capacitance 188 about .2 microfarads and the value of the current source 180 about 20 volts depending on the geometry of the neuristor employed and the results desired.

To produce neuristor operation, a negative impulse of, for example, one volt is applied across the current source 184 and resistor 182 through input terminals 190 and 192. This impulse as described hereinabove in connection with the embodiments of FIGURES 1–9 will change the potential in the vicinity of the injector ring 164 sufficiently to cause the transfer cell of the neuristor which includes the ring 164 to trigger. The triggering of the cell including injector ring 164 will in turn alter the potential in the vicinity of the cell including the injector ring 165 which will in turn cause the latter cell to trigger. In this manner, each neuristor cell proceeding from right to left in FIGURE 13 will be triggered in succession so as to transfer an impulse from right to left through the semiconductor body 150 at a substantially uniform and controlled velocity. After the passage of this impulse across any given point of the neuristor, there will be present a refractory period in which the operating point of that cell of the neuristor cannot be stimulated unless a greater than normal triggering impulse is applied to it.

Figure 10:
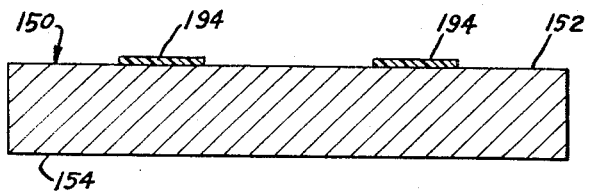
FIGURE 10 is a central vertical cross-sectional view of another form of neuristor in accordance with the invention during the first step of its preparation.
Figure 11:
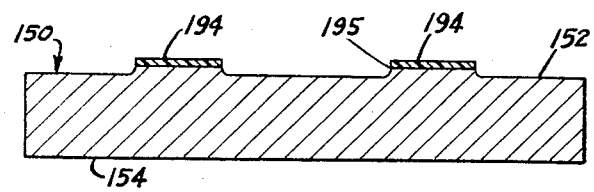
FIGURE 11 is a view similar to FIGURE 10 showing the next preparation step.
Figure 14:
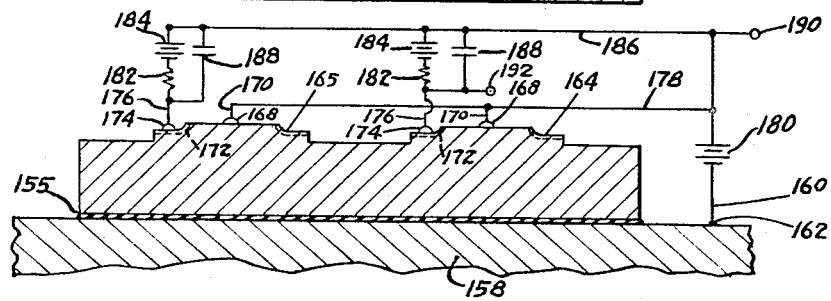
FIGURE 14 is a central vertical cross-sectional view showing the finished neuristor and a typical wiring diagram.

One process for producing a neuristor of the type illustrated in FIGURE 14 will now be described with reference to FIGURES 10–14. As a first step in the preparation of the neuristor, a flat disk of a suitable commercially available semi-conductor material such as a 660 ohm-centimeter lightly doped p type silicon is sliced to a thickness of about one millimeter. The surfaces are then smoothed conventionally. The disk 150 is then covered on its upper surface at spaced apart locations with circular masks which can be formed, for example, from black wax 194 which is melted and applied by means of a brush or other instrument to the upper surface 152 of the disk 150 as shown in FIGURE 10. Any desired number of masked areas can be provided, two such masked areas being shown in FIGURE 10.

After the masks 194 have been applied, the disk 150 is placed in a suitable semi-conductor etching bath which can comprise a mixture of 15 cc. of acetic acid, 25 cc. of concentrated nitric acid, 15 cc. of 48% hydrofluoric acid and .3 cc. of bromine which is added just before using.

Figure 12:
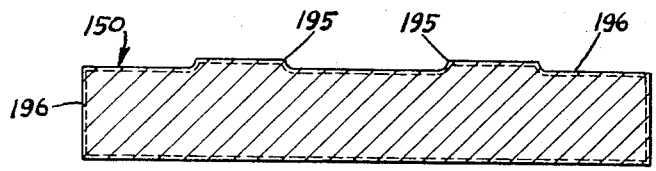
FIGURE 12 is a view similar to FIGURE 11 showing a succeeding preparation step.
Figure 13:
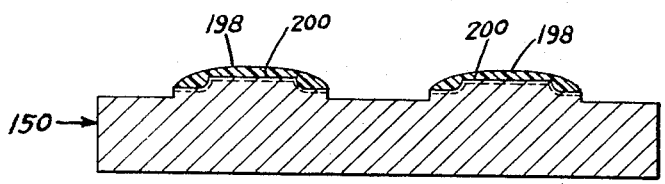
FIGURE 13 is a view illustrating a preparation step following that illustrated in FIGURE 12.

The semi-conductor disk 150 is kept in the bath from one to two minutes so as to form means 195 beneath the masks 194. It is taken out and the masks 194 are removed. Disk 150 is then placed in a suitable diffusion oven at about 1100° C. for from 3 to 4 hours during which an electron donor material such as a phosphorous is applied to the semi-conductor disk 150. This is accomplished by passing nitrogen gas containing vapors of trimethylphosphate over its surface. During this process, the phosphorous atoms are diffused into the surface of the disk 150 to a depth of approximately 50–100 microns thus forming a p-n junction 196 over its entire surface (FIGURE 12).

Next, another mask of black wax designated 198 (FIGURE 13) is applied over each mesa and over an area extending radially therefrom for a distance of about 1 mm. The semi-conductor body is then placed in the etching bath a second time to etch away the p-n junction 196 over the entire surface of the semi-conductor disk 150 except that beneath the masks 198 as clearly shown in FIGURE 13. After this has been done, the masks 198 are removed by washing with a suitable solvent and the top 200 of each mesa 195 is removed by same suitable means such as using an abrasive to polish the tops of the mesas. A silicon carbide abrasive made of particles of about 300 to 600 mesh can be used successfully. After this step has been performed, a p-n junction will only be present around the mesas thus defining the injector rings 164 and 165. The ohmic contact 156 can then be produced on the lower surface 154 of the semi-conductor body 150, for example, by plating with nickel. This step is followed by affixing the semi-conductor body 150 to the base 158 by means of the soldered connection 155.

The conductors 170 and 176 can be affixed to the center of each mesa and to the p-n junctions respectively in any suitable manner known to the art. A preferred method of affixing these conductors is by thermocompression bonding. In this process, a gold wire is held in the orifice of a glass tube which has been drawn to a relatively small diameter such as 5 mills. The part of the gold wire projecting through the orifice is then heated to form a gold ball. The gold ball is then forced under pressure onto the surface of either the injector ring or the center of the mesa 195 at a temperature of from 300° C. to 400° C. until a bond is formed. The gold wires are then suitably wired for neuristor operation, for example, as shown in FIGURE 14.

Figure 15:
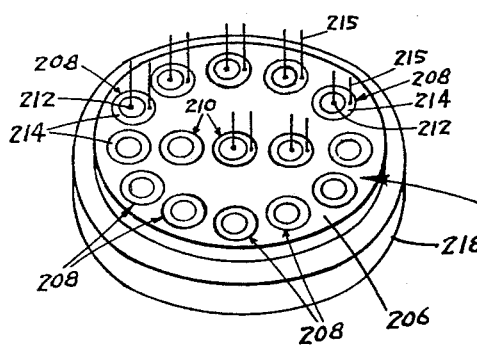
FIGURE 15 is a perspective view of another neuristor of the general type of FIGURE 14.

Refer now particularly to FIGURE 15 which shows another form of neuristor according to this invention. The neuristor of FIGURE 15 includes a lightly doped semi-conductor disk body 205 such as p type silicon having a resistivity of 660 ohm-centimeters. The body 205 is circular in shape and can for example be on the order of ¾ inch in diameter and 1 millimeter in thickness. Upon the upper surface 206 of the semi-conductor disk 205 are provided a plurality of cells 208 arranged in a circular pattern and a plurality of cells 210 which are aligned along a diameter of the circle formed by the cells 208 to form two junctions one on each side of the circle 208. The cells 208 and 210 each include an ohmic contact 212 at the center to which a lead wire is secured and a circular p-n junction 214 is positioned to extend around the ohmic contact 212 to which a lead wire 215 is secured. The inside diameter of each of the junctions 214 can be about 1 millimeter and the outside diameter can be about 2 millimeters. A brass base 218 is conductively connected to the base of the silicon disk 205 to provide a second ohmic contact on the lower surface of the disk 205. The neuristor of FIGURE 15 can be wired substantially as shown in FIGURE 14.

With the proper current supplied to the base 218, the ohmic contacts 212 and the p-n junctions 214, an impulse once initiated in a ring of cells will trigger each adjacent cell proceeding around the ring to act as a memory device. Such an impulse will continue indefinitely so long as the potentials are maintained.

Several types of junctions between lines of cells can be produced with the present invention including T, and S type junctions described by H. D. Crane in the article referred to hereinabove. To prevent an impulse from travelling along a given line of cells it is possible to connect each p-n junction ring of one line of cells with the corresponding p-n junction ring in an intersecting line of cells preferably through a capacitance. The effect of this is to produce a small pulse on each p-n junction ring of the non-energized line of cells so as to shift the operating point of each cell such that it cannot become triggered by the pulse travelling toward the junction.

Like the neuristor described in connection with FIGURES 1–9, the neuristor of the type illustrated in FIGURES 10–15 can be used for the construction of new types of digital computers employing new logic techniques. It can also be used in applications where microelectronic techniques are desired to conserve space and reduce the distance between components. It has the further advantage of enabling any reasonable number of lines of cells to intersect at a point without interference between lines. I also contemplate the use of the invention in converting parallel information to series form.

In the course of testing the neuristor constructed as described in connection with FIGURES 10–15, impulse transmission characteristics between four adjacent cells over a total distance of about ½ centimeter was studied. It was found that the impulse propagated along the line of cells had a velocity of about 200 meters per second.

There are a number of ways in which the neuristor according to the present invention can be wired in a circuit, for example, by reversing the polarity of the current source 180 of FIGURE 14, the device could be made to operate in a somewhat different manner from that described hereinabove.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A neuristor comprising in combination a lightly doped body of one type of conductivity formed from a semi-conductor material, first and second spaced apart ohmic contacts connected to said body, conductor means connected to said contacts for connecting a source of current across said contacts to establish a potential gradient through the body between said contacts, a plurality of spaced apart regions of opposite conductivity forming p-n junctions with said body, said p-n junctions positioned between said contacts, current driver means connected between each of said junctions and one of said ohmic contacts, and input means connected to one of said p-n junctions, said input means providing an input pulse to said one p-n junction for attenuationless propagation through said body by said p-n junctions.

2. The apparatus according to claim 1 wherein a capacitance means is conductively connected between each of said p-n junctions and said one ohmic contact.

3. The apparatus according to claim 1 wherein said current driver means include resistance means connected in series relationship with further current source means.

4. A neuristor comprising in combination a single layer of current conducting semi-conductor material, at least first and second spaced apart and elongated ohmic contacts connected to said layer, at least one of said contacts being bifurcated to form first and second terminal portions, a plurality of linearly arranged p-n junctions extending along lines parallel to the ohmic contacts.

5. The apparatus according to claim 4 wherein said ohmic contact having a bifurcated portion has a Y shape.

6. The apparatus according to claim 4 wherein the p-n junctions extending in lines parallel to said bifurcatd portions are connected in pairs, the pairs comprising ne junction from each of said lines and in corresponding ositions in the respective line.

7. The apparatus according to claim 6 wherein capacitor means connect each pair of junctions.

8. A neuristor comprising in combination a body composed of a lightly doped semi-conductor material, a first ohmic contact connected to said semi-conductor body on one side thereof, said first ohmic contact having a three elongated segment connected together conductively, a second ohmic contact including segments positioned parallel with said portions of said first ohmic contact, said segments being conductively connected together, said second ohmic contact being positioned on the opposite side of said body from said first ohmic contact, a plurality of linearly arranged discrete and spaced apart p-n junctions disposed on said body laterally of said second contact to form a first line of contacts paralleling portions of said first and second ohmic contacts and a pair of diverging lines of p-n junctions paralleling diverging portions of said first and second ohmic contacts.

9. The apparatus according to claim 8 wherein the p-n junctions of said divering lines of p-n junctions are connected in pairs, the pairs comprising one junction from each of said diverging lines and in corresponding positions in the respective line.

10. A neuristor formed from a body of semi-conductor material having first and second parallel surfaces, first and second ohmic contacts mounted upon said first and second parallel surfaces respectively, said first ohmic contact having a first elongated portion and a pair of diverging elongated portions, all of said portions being conductively connected together, said second ohmic contact including elongated portions positioned generally parallel to the elongated portions of said first ohmic contact, one elongated portion of said second ohmic contact being spaced apart from the other portions of said second ohmic contact and a plurality of linearly arranged spaced apart p-n junctions secured to said second surface of said body along lines positioned in parallel relationship with each portion of said second ohmic contact.

11. The apparatus according to claim 10 wherein conductor means are operatively connected to said first and second ohmic contacts for producing a potential gradient that can be established across said semi-conductor body and conductor means is secured to each of said p-n junctions for connecting a source of current between each of said p-n junctions and said second ohmic contact and conductor means for connecting a capacitance between each of said p-n junctions and said second ohmic contact.

12. A neuristor comprising in combination a semi-conductor body of one type of conductivity and having a pair of spaced surfaces, an ohmic contact connected to one of the surfaces, a plurality of spaced apart further ohmic contacts connected to the other surface current source means connected between said ohmic contact and said further ohmic contacts, a plurality of substantially ring-shaped regions of opposite conductivity forming p-n junctions with said body, each of said ring-shaped junctions extending substantially around one of said spaced apart ohmic contacts and input means connected to one of said p-n junctions.

13. The apparatus according to claim 12 wherein the spaced apart ohmic contacts upon said other surface are arranged in at least one line to form impulse transmission paths.

14. The apparatus according to claim 13 wherein a plurality of said lines intersect at a point to form a junction.

15. A neuristor comprising in combination a sheet of a lightly doped semi-conductor material having spaced apart substantially parallel surfaces, an ohmic contact connected to extend over substantially the full area of one of said surfaces, a plurality of spaced apart ohmic contacts connected to the other said surface and arranged in lines to form paths for impulse transmission from one ohmic contact to the next, and a ring-shaped p-n junction extending around each of the ohmic contacts spaced from the next adjacent junction, said semi-conductor material being a transistor silicon having a resistivity of about 660 ohm-centimeters, and said p-n junction comprising phosphorus alloyed into the surface of the semi-conductor in the form of a ring.

16. The apparatus according to claim 12 wherein said semi-conductor body is a transistor silicon having a resistivity of about 660 ohm-centimeters, and said p-n junctions comprise phosphorus alloyed into the surface of the semi-conductor body in the form of a ring.

17. The apparatus according to claim 16 wherein the phosphorus is alloyed into the silicon to a depth of about 50–100 microns.

References Cited

UNITED STATES PATENTS

| 2,877,358 | 6/1955 | Ross | 307—88.5 |
| 3,090,873 | 5/1963 | Mackintosh | 307—88.5 |
| 3,103,599 | 9/1963 | Henkels | 307—88.5 |
| 3,154,444 | 10/1964 | Wieland | 148—177 |
| 3,154,445 | 10/1964 | Tomono et al. | 148—179 |
| 3,213,339 | 10/1965 | Henkels | 317—235 |

FOREIGN PATENTS 1,037,293  9/1953  France.

JOHN W. HUCKERT, *Primary Examiner.*

M. EDLOW, *Assistant Examiner.*